(12) United States Patent
Verbeke et al.

(10) Patent No.: US 10,694,312 B2
(45) Date of Patent: Jun. 23, 2020

(54) DYNAMIC AUGMENTATION OF REAL-WORLD SOUNDS INTO A VIRTUAL REALITY SOUND MIX

(71) Applicant: HARMAN INTERNATIONAL INDUSTRIES, INCORPORATED, Stamford, CT (US)

(72) Inventors: Joseph Verbeke, San Francisco, CA (US); Adam Boulanger, Palo Alto, CA (US); Davide Di Censo, Sunnyvale, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/329,712

(22) PCT Filed: Aug. 30, 2017

(86) PCT No.: PCT/US2017/049501
§ 371 (c)(1),
(2) Date: Feb. 28, 2019

(87) PCT Pub. No.: WO2018/045112
PCT Pub. Date: Mar. 8, 2018

(65) Prior Publication Data
US 2019/0200158 A1    Jun. 27, 2019

Related U.S. Application Data

(60) Provisional application No. 62/382,455, filed on Sep. 1, 2016.

(51) Int. Cl.
*H04S 7/00* (2006.01)
*G10L 21/0232* (2013.01)
(Continued)

(52) U.S. Cl.
CPC .............. *H04S 7/303* (2013.01); *G06F 1/163* (2013.01); *G06F 3/005* (2013.01); *G06F 3/012* (2013.01);
(Continued)

(58) Field of Classification Search
CPC ........ H04S 7/303; H04S 7/30; H04S 2400/11; H04S 2420/01; H04S 2420/03;
(Continued)

(56) References Cited

U.S. PATENT DOCUMENTS

2013/0050432 A1    2/2013  Perez et al.
2013/0236040 A1    9/2013  Crawford et al.
(Continued)

OTHER PUBLICATIONS

International Search Report for Application No. PCT/US2017/049501, dated Nov. 23, 2017, 14 pages.

*Primary Examiner* — Mark Fischer
(74) *Attorney, Agent, or Firm* — Artegis Law Group, LLP

(57) ABSTRACT

A wearable simulation system worn by a user outputs optical and acoustic signals that cause the user to perceive a simulation. The simulation may be an immersive virtual world or, alternatively, an augmentation to the real world. The wearable simulation system also captures acoustic and optical signals from the environment around the user and then selectively incorporates these signals into the simulation. Accordingly, the user may perceive the environment to a limited extent, while still remaining engaged with the simulation. At least one advantage of the disclosed techniques is that the wearable simulation system does not completely interfere with user perception of the environment, thereby reducing the risk of the user missing important real-world events or being otherwise unaware of such real-world events.

20 Claims, 16 Drawing Sheets

(51) Int. Cl.
     *G06F 3/01*            (2006.01)
     *G06F 1/16*            (2006.01)
     *G06F 3/16*            (2006.01)
     *G06F 3/00*            (2006.01)
     *G06T 13/00*           (2011.01)
     *G06Q 10/04*           (2012.01)
     *G10L 21/0208*        (2013.01)

(52) U.S. Cl.
     CPC ............. *G06F 3/165* (2013.01); *G06Q 10/04* (2013.01); *G06T 13/00* (2013.01); *G10L 21/0232* (2013.01); *H04S 7/30* (2013.01); *G10L 21/0208* (2013.01); *H04S 2400/11* (2013.01); *H04S 2420/01* (2013.01); *H04S 2420/03* (2013.01)

(58) Field of Classification Search
     CPC .......... G06F 1/163; G06F 3/005; G06F 3/012; G06F 3/165; G06Q 10/04; G06T 13/00; G10L 21/0232; G10L 21/0208
     See application file for complete search history.

(56) References Cited

U.S. PATENT DOCUMENTS

| | | |
|---|---|---|
| 2015/0373474 A1 | 12/2015 | Kraft et al. |
| 2016/0080874 A1 | 3/2016 | Fullam |
| 2016/0125869 A1 | 5/2016 | Kulavik et al. |

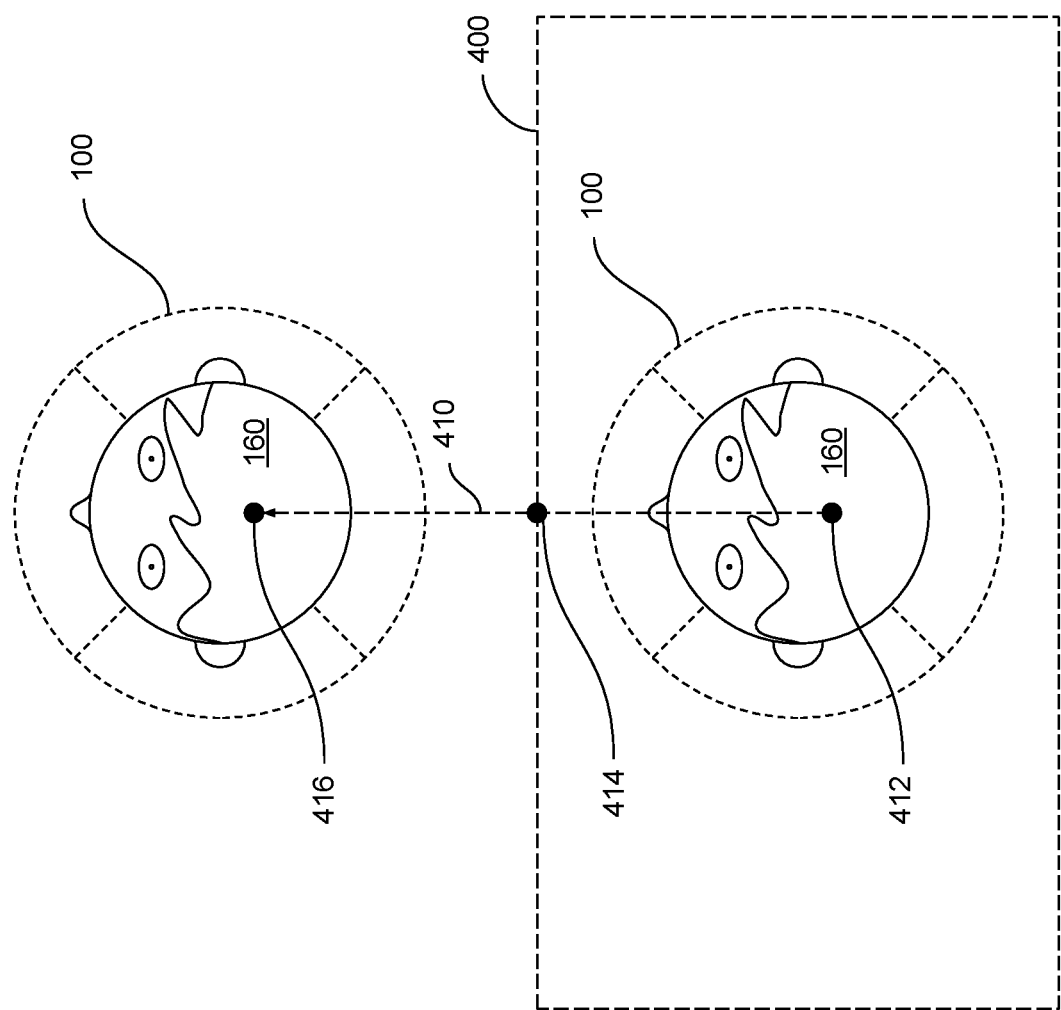

DYNAMIC AUGMENTATION OF REAL-WORLD SOUNDS INTO A VIRTUAL REALITY SOUND MIX

CROSS-REFERENCE TO RELATED APPLICATIONS

The present application is a national stage application of the international application titled, "DYNAMIC AUGMENTATION OF REAL-WORLD SOUNDS INTO A VIRTUAL REALITY SOUND MIX," filed on Aug. 30, 2017 and having application number PCT/US2017/049501, which claims the priority benefit of the U.S. Provisional Application titled, "DYNAMIC AUGMENTATION OF REAL-WORLD SOUNDS INTO A VIRTUAL REALITY SOUND MIX," filed on Sep. 1, 2016 and having application No. 62/382,455. The subject matter of these related applications is hereby incorporated herein by reference.

BACKGROUND

Field of the Disclosed Embodiments

The disclosed embodiments relate generally to audio devices and, more specifically, to dynamic augmentation of real-world sounds into a virtual reality sound mix.

Description of the Related Art

Conventional virtual reality (VR) systems generally include a wearable computing platform that immerses a user within a simulation. For example, and without limitation, conventional VR systems typically include both optical and acoustic output devices that generate 3D graphics data and sound data, respectively, representing the simulation. When using a conventional VR system, the user may interact with the simulation by moving around within the real-world environment. The VR system tracks the real-world movements of the user and then translates these movements into the simulation. Accordingly, the VR system provides the user with the impression that he or she is moving around within, and interacting with, the simulation.

A conventional augmented reality (AR) system is another wearable computing platform that augments a real-world environment in which a user is located with simulated elements, without completely immersing the user into a simulation. Like conventional VR systems, conventional AR systems include optical and acoustic output devices for generating 3D graphics and sound data. However, a conventional AR system also allows optical and acoustic data from the real-world environment to pass through the AR system to the user. Specifically, optical and acoustic data from the real-world environment is augmented with 3D graphics and sound data generated by the AR system, thereby causing the user to perceive an augmented version of that environment. Like conventional VR systems, conventional AR systems translate real-world movements of the user into the augmented version of the environment. Accordingly, the AR system may provide the user with the impression that he or she is moving around within and interacting with an augmented version of the environment.

As a general matter, both VR systems and AR systems fall within a broad category of devices referred to hereinafter as "wearable simulation systems." Wearable simulation systems generate and output simulations to the user by either completely immersing the user into a simulation (as implemented by VR systems) or partially immersing the user into an augmented version of the environment (as implemented by AR systems). In either case, simulations generated by wearable simulation systems interfere with the user's perception of the real world. This interference with real-world perception may pose various issues for the user.

In particular, the user may want to perceive specific real-world events while interacting with a wearable simulation system. However, such events are often obscured from the user when the user is engaged in a simulation generated by a wearable simulation system. For example, and without limitation, the user could want to receive incoming phone calls, yet the user would be unable to hear those phone calls when using the wearable simulation system. Further, the user may want to avoid certain real-world situations, yet the user would be unable to perceive such situations when using the wearable simulation system. For example, and without limitation, the user may wish to avoid bumping into a pet while using the wearable simulation system, yet the presence of the pet may be obscured by the simulation.

As the foregoing illustrates, improved techniques for interacting with a wearable simulation system would be useful.

SUMMARY

One or more embodiments set forth include a computer-implemented method for modifying a simulation generated by a wearable simulation system, including acquiring sensor data from an environment in which the wearable simulation system is located, determining that the sensor data meets a first criterion, identifying a first protocol corresponding to the first criterion, incorporating a first portion of data into the simulation based on the first protocol, where the first portion of data comprises at least one of a representation of a portion of the sensor data and a signal that originates from the environment.

At least one advantage of the disclosed embodiments is that the wearable simulation system does not completely interfere with user perception of the environment, thereby reducing the risk of the user missing important real-world events or being otherwise unaware of real-world events.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosed embodiments subsumes other embodiments as well.

FIG. 4 illustrates a boundary for mixing environment audio with simulation audio, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As discussed above, wearable simulation systems can interfere with the ability of a user to perceive the real-world environment in which the user resides. This interference can cause various issues for the user. To address these issues, various embodiments include a wearable simulation system that mixes audio derived from the environment with audio associated with a simulation. By mixing together environment audio and simulation audio in this manner, the wearable simulation system may reduce the extent to which the simulation interferes with user perception of the environment. Various techniques for selectively mixing together environment audio and simulation audio are described in greater detail below in conjunction with FIGS. 1A-12.

System Overview

Figure 1A:
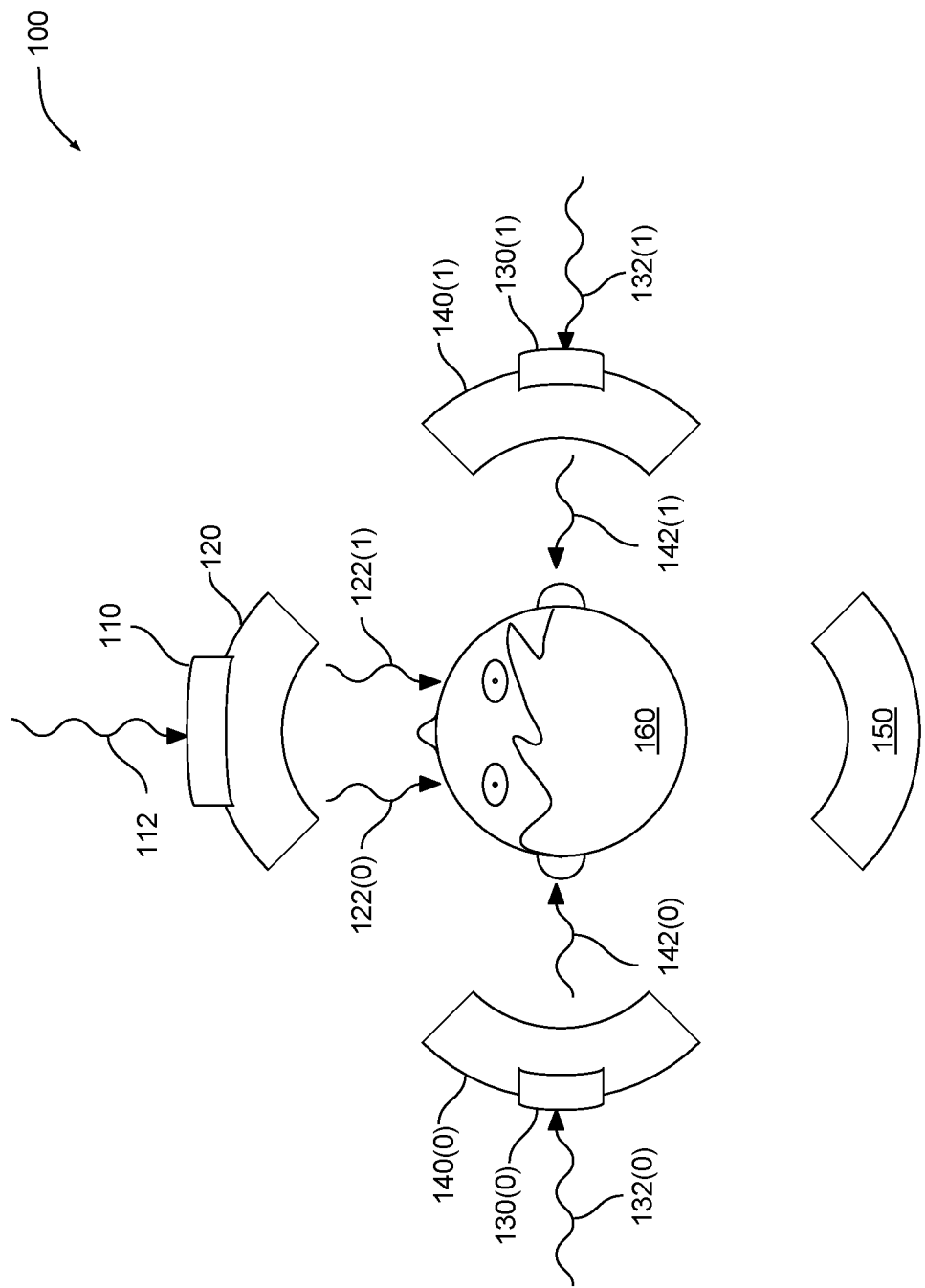
FIGS. 1A-1B illustrate a system configured to implement one or more aspects of the various embodiments.
Figure 1B:
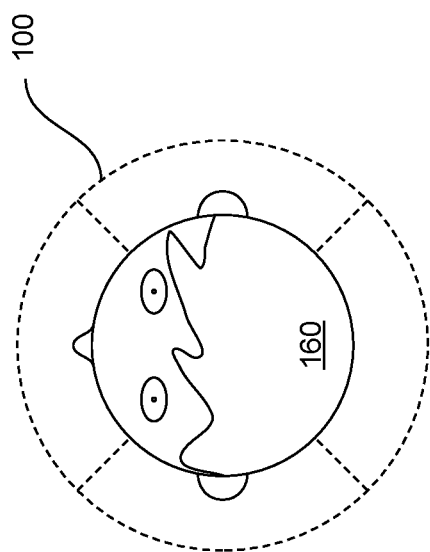

FIGS. 1A-1B illustrate a wearable simulation system 100 configured to implement one or more aspects of the various embodiments. Wearable simulation system 100 may be a VR system configured to generate and output audiovisual data that represents a simulation. Wearable simulation system 100 may also be an AR system configured to augment audiovisual data derived from the environment with audiovisual data associated with a simulation. Additionally, wearable simulation system 100 may have features associated with both AR systems and VR systems.

As shown in FIG. 1A, a wearable simulation system 100 includes an optical sensor array 110, an optical output device 120, acoustic sensor arrays 130(0) and 130(1), acoustic output devices 140(0) and 140(1), and computing device 150. Optical sensor array 110 receives optical signals 112. Optical output device 120 is coupled to optical sensor array 110 and configured to generate optical signals 122. Acoustic sensor arrays 130 receive acoustic signals 132. Acoustic output devices 140 are coupled to acoustic sensor arrays 130 and configured to generate acoustic signals 142.

Optical sensor array 110 may include any technically feasible apparatus for detecting and/or measuring electromagnetic waves, especially visible light. Optical sensor array 110 may include one or more video cameras, stereoscopic imaging devices, infrared sensors, LIDAR sensors, RADAR sensors, time-of-flight sensors (acoustic and otherwise), and any combination thereof. Optical output device 120 is coupled to optical sensor array 110 and may include any technically feasible device for outputting optical data, including stereoscopic video screens, laser-based visualization systems, heads-up displays, and any combination thereof.

Acoustic sensor arrays 130 may be any technically feasible apparatus for detecting and/or measuring acoustic waves, especially sound in the normal range of human hearing. Acoustic sensor arrays 130 may include one or more microphones, acoustic transducers, beamforming devices, ultrasonic detectors, and any combination thereof. Acoustic output devices 140 are coupled to acoustic sensor arrays 130 and may include any technically feasible device for outputting acoustic data, including one or more speakers, ultrasonic devices, acoustic transducers, bone conduction transducers, tactile transducers, and any combination thereof. Persons skilled in the art will understand that any technically feasible mounting of the aforementioned components falls within the scope of the disclosed embodiments.

Computing device 150 is a computer that coordinates all operations of wearable simulation system 100. Computing device 100 also generates and maintains a simulation. The simulation may represent an immersive virtual world that is separate from the environment around user 160. The simulation may also include augmentations to the environment proximate to user 160.

In operation, computing device 150 processes optical signals 112 and acoustic signals 132 captured from the environment. Computing device 150 also generates optical signals 122 and acoustic signals 142, and then outputs those signals to user 160. Optical signals 122 may be derived from optical signals 112 and/or generated to implement the simulation mentioned above. In like manner, acoustic signals 142 may be derived from acoustic signals 132 and/or generated to implement the simulation mentioned above. Computing device 150 is described in greater detail below in conjunction with FIG. 2.

As shown in FIG. 1B, wearable simulation system 100 is generally worn on or around the head of user 160. Wearable simulation system 100 may include head-mounted components, shoulder-mounted components, in-ear components, components mounted to other parts of the body of user 160, and any combination thereof. Wearable simulation system 100 may also include components mounted external to user 160. For example, and without limitation, wearable simulation system 100 could include one or more wall mounted sensors and/or output devices coupled wirelessly to computing device 150 and configured to track the movements of user 160 within a predefined physical space. Further, and without limitation, wearable simulation system 100 could include external acoustic output devices, such as directional acoustic devices that beam sound directly to the ears or user 160.

Figure 2:
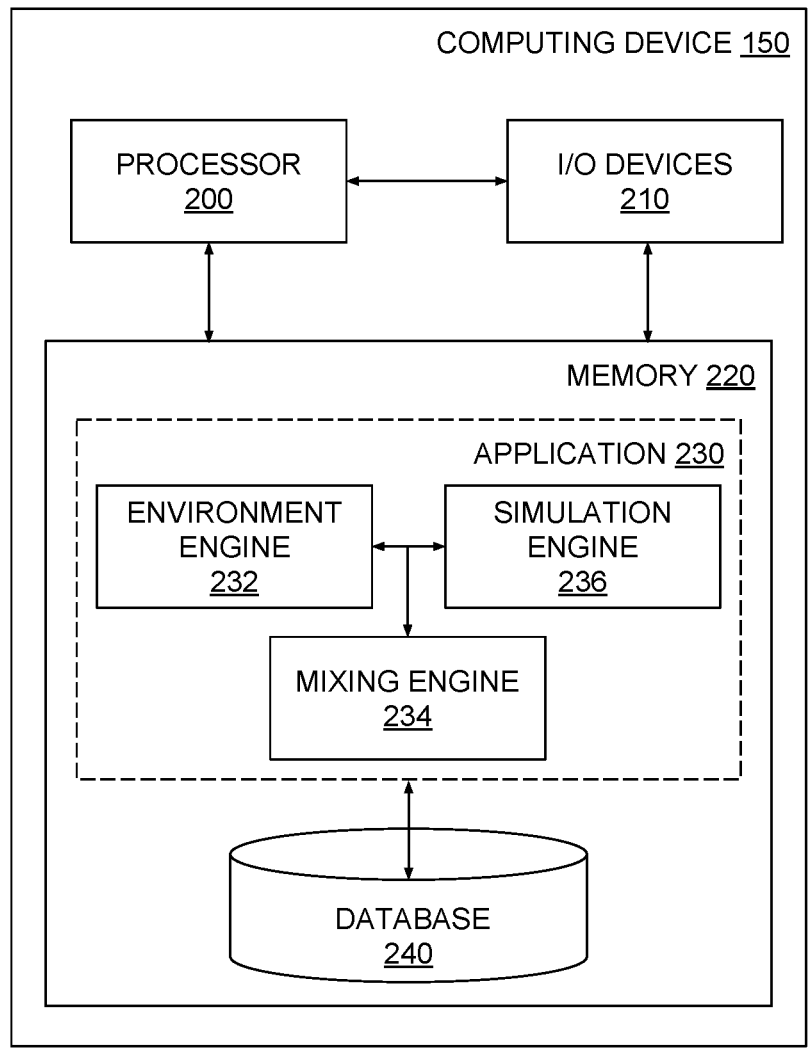
FIG. 2 is a more detailed illustration of the computing device of FIG. 1A, according to various embodiments.

FIG. 2 is a more detailed illustration of the computing device of FIG. 1A, according to various embodiments. As shown, computing device 150 includes a processor 200, input/output (I/O) devices 210, and a memory 220, coupled together. Processor 200 may be any technically feasible device configured to process data and execute software applications. For example, and without limitation, processor 200 could be a central processing unit (CPU), a graphics processing unit (GPU), a digital signal processor (DSP), and any combination thereof. I/O devices 210 include devices for receiving input, devices for producing output, and devices that both receive input and produce output. For example, and without limitation, I/O devices 210 could include a keyboard, a speaker, and/or a touchscreen, among other possibilities. Memory 220 may be any technically feasible storage medium configured to store data and software applications. For example, and without limitation, memory 220 could include a hard disk and/or random access memory (RAM) coupled together.

Memory 220 includes a simulation application 230 and a database 240. Simulation application 230 processes optical and acoustic signals received from the environment around user 160. Simulation application 230 also generates simulations that may incorporate the signals received from the environment around user 160. Simulation application 230 includes an environment engine 232, a mixing engine 234, and a simulation engine 236. These various modules interoperate to perform the overall functionality of simulation application 230, as described in greater detail below in conjunction with FIG. 3.

Figure 3:
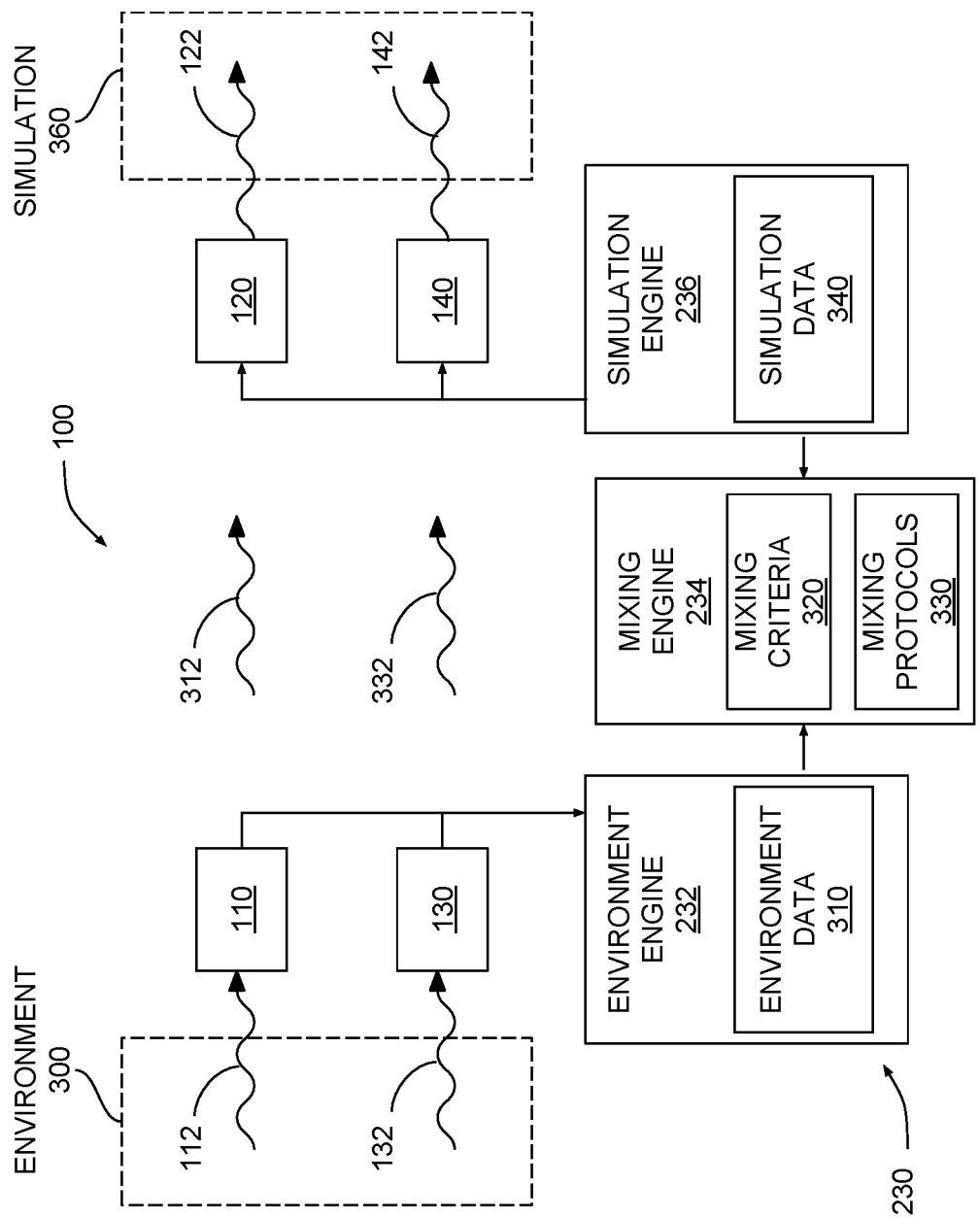
FIG. 3 is a conceptual diagram illustrating how the simulation application of FIG. 2 generates a simulation, according to various embodiments.

FIG. 3 is a conceptual diagram illustrating how the simulation application of FIG. 2 generates a simulation, according to various embodiments. As shown, optical sensor array 110 receives optical signals 112 from environment 300. Similarly, acoustic sensor array 130 receives acoustic signals 132 from environment 300. Based on optical signals 112 and acoustic signals 132, environment engine 232 generates environment data 310. Environment data 310 includes a model of the spatial, visual, and/or acoustic environment relative to user 160. For example, and without limitation, environment engine 232 could process optical signals 122 to generate a spatial or visual map of environment 300 relative to the position of user 160. In another example, and without limitation, environment engine 232 could process acoustic signals 132 to generate an acoustic map of environment 300 around user 160. In doing so, environment engine 232 would identify specific audio sources within environment 300 and associated those sources with specific spatial locations to generate the acoustic map.

In parallel with the operation of environment engine 232, simulation engine 236 generates simulation data 340. Simulation data 340 specifies various graphical and acoustic elements that may be used to construct a simulation 360. Based on simulation data 340, simulation engine 236 causes optical output device 120 and acoustic output devices 140 to output optical signals 122 and acoustic signals 142, respectively, to represent simulation 360. Based on these signals, user 160 may perceive simulation 360. Simulation 360 could be, for example and without limitation, an immersive virtual world simulation, as typically associated with VR systems, or a partial augmentation to environment 300, as typically associated with AR systems. In some embodiments, simulation engine 236 may be part of a gaming engine, and simulation data 340 may represent a simulated world in which gaming occurs. Thus, when engaged with simulation 360, user 160 may participate in a video game. In other embodiments, simulation 360 is a recreation of a real world environment associated with another user located remotely. In such embodiments, simulation 360 augments the audio and/or visual experience of user 160 to support a telepresence use case.

Mixing engine 234 is configured to interoperate with environment engine 232 and simulation engine 236 to incorporate optical signals 112 and/or acoustic signals 132 from environment 300 into simulation 360. Mixing engine 234 determines the specific optical and/or acoustic signals (or portions thereof) to incorporate based on mixing criteria 320. For example, and without limitation, one mixing criteria 320 could indicate that acoustic signals within a particular frequency range should be incorporated into simulation 360. Those mixing criteria 320 could also indicate that simulation sounds having a particular frequency range should be suppressed.

Mixing engine 234 may also implement a number of different mixing protocols 330 that describe how optical signals 112 and/or acoustic signals 132 are incorporated into simulation 360. For example, and without limitation, mixing engine 234 could track the location of user 160 within environment 300 and then, according to a mixing protocol 330, fade optical and/or acoustic signals derived from environment 300 into or out of simulation 360 based on the distance between user 160 and a boundary. In another example, and without limitation, mixing engine 234 could identify specific objects and/or audio sources within environment 300, as indicated by environment data 310, and then selectively incorporate optical and/or audio signals from those sources into simulation 360 based on one or more mixing protocols 330.

Mixing protocols 330 may also specify other ways of incorporating optical signals 112 and/or acoustic signals 132 into simulation 360. In one embodiment, based on a mixing protocol 330, mixing engine 234 causes simulation engine 236 to modify simulation data 340 so that simulation 360 includes simulated versions of optical signals 112 and/or acoustic signals 132. For example, and without limitation, mixing engine 234 could cause simulation engine 236 to generate a simulated version of an object that resides in environment 300, and then output this simulated version to user 160 via optical output device 120. The simulated object could be extracted from a database of simulated objects or derived from a scan of a real-world object. In another example, and without limitation, mixing engine 234 could cause simulation engine 236 to generate an amplified version of an environment sound and then output this sound to user 160 via audio output device 140. In doing so, audio output device 140 could transduce the environment sound from environment 300 directly into simulation 360 in order to replace specific simulation sounds. The embodiments described above may be implemented when wearable computing system 100 operates as a VR system.

In other embodiments, according to a mixing protocol 330, mixing engine 234 configures wearable simulation system 100 to operate as a pass-through device and then selectively allows portions 312 and 332 of optical signals 112 and/or acoustic signals 132, respectively, to pass into simulation 360 from environment 300. Mixing engine 234 could, for example and without limitation, implement active noise control (ANC) to cancel environment sounds that would otherwise be audible to user 160 until determining that some or all of those sounds should be introduced into simulation 360. Then, mixing engine 234 could reduce ANC cancellation to allow passage of the environment sounds into simulation 360. In addition, mixing engine 234 could implement active acoustic transparency (AAT) to actively transduce environment sounds into simulation 360. Mixing engine 234 may also selectively reduce specific frequencies of sound already present in simulation 360 in order to allow those specific frequencies to pass into simulation 360 with reduced interference. The embodiment described above may be implemented when wearable computing system 100 operates as an AR system.

Persons skilled in the art will understand that many different techniques for mixing optical signals and/or acoustic signals exist in the art. Wearable simulation system 100 may apply any of these techniques in order to modify simulation 360 to incorporate specific data derived from environment 300. FIGS. 4-10 illustrate specific examples of how wearable simulation system 100 mixes together acoustic signals from environment 300 with simulation 360.

Mixing Environment Sounds Based on Location

Figure 5A:
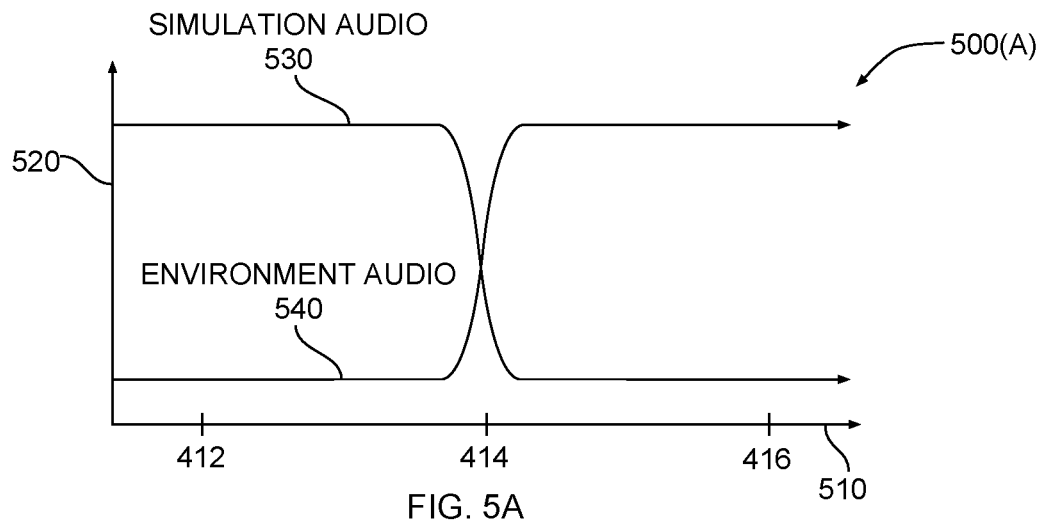
FIGS. 5A-5H illustrate various graphs of how the simulation application of FIG. 2 mixes environment audio with simulation audio, according to various embodiments.
Figure 5B:
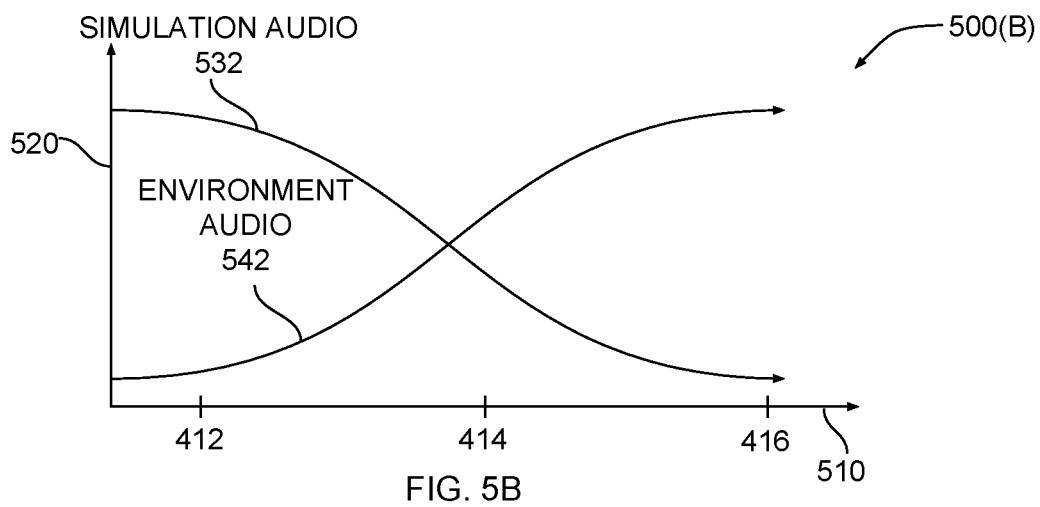
Figure 5C:
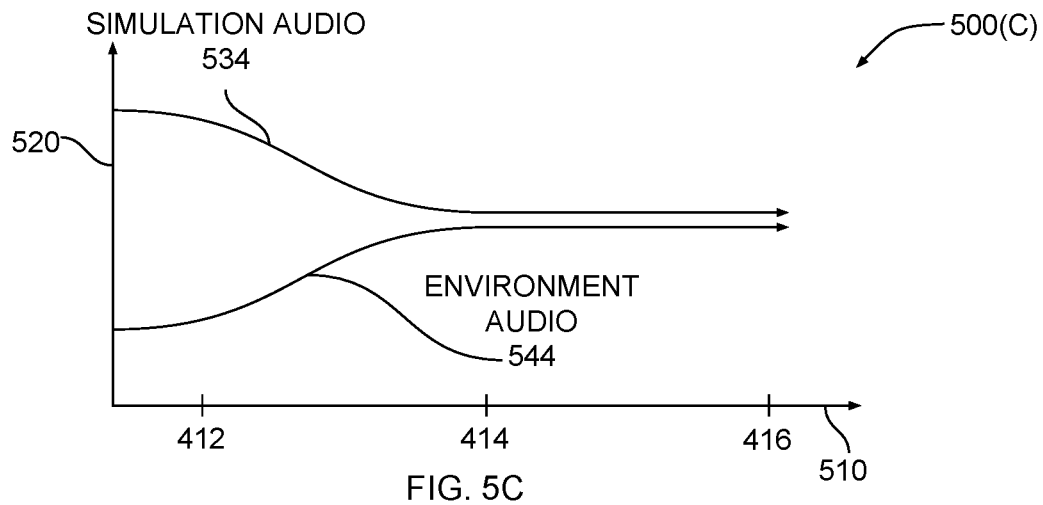
Figure 5D:
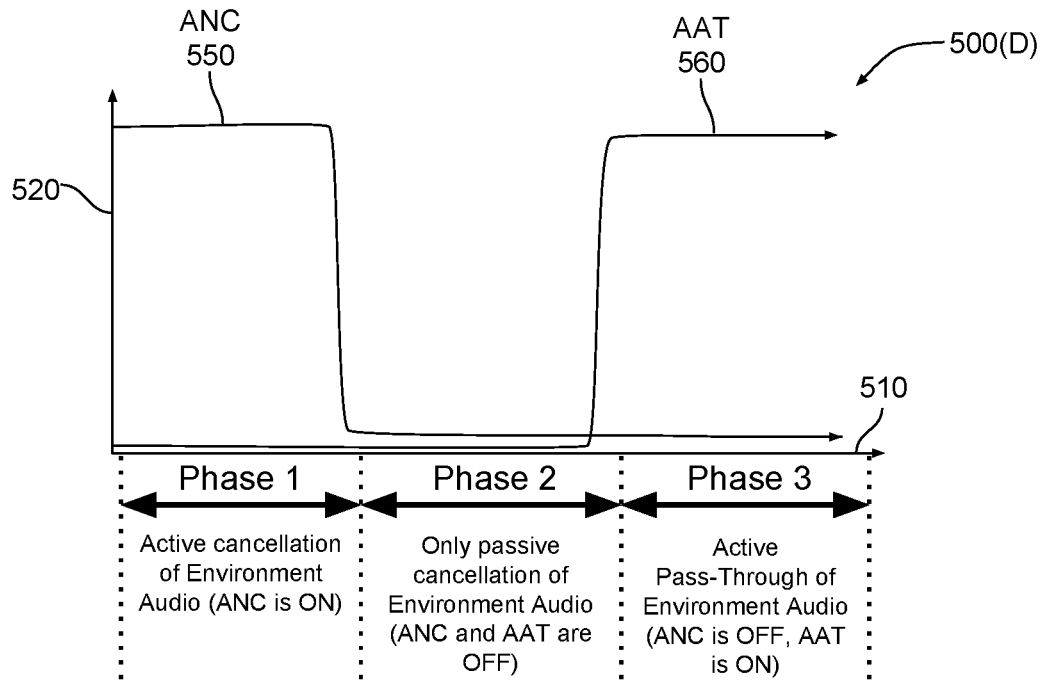
Figure 5E:
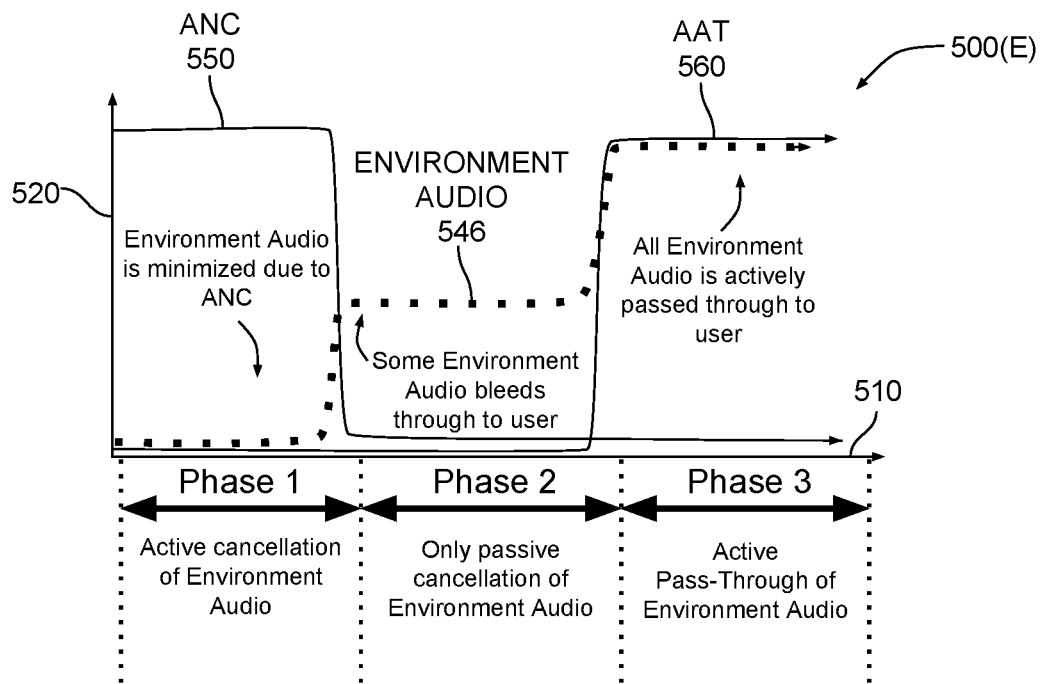
Figure 5F:
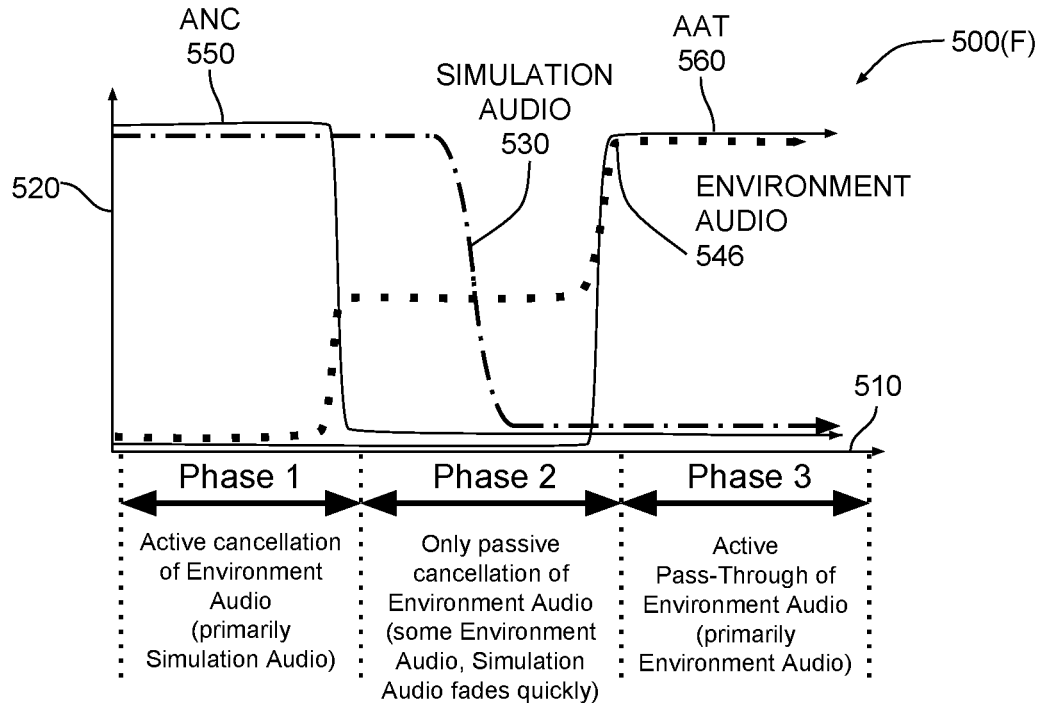
Figure 5G:
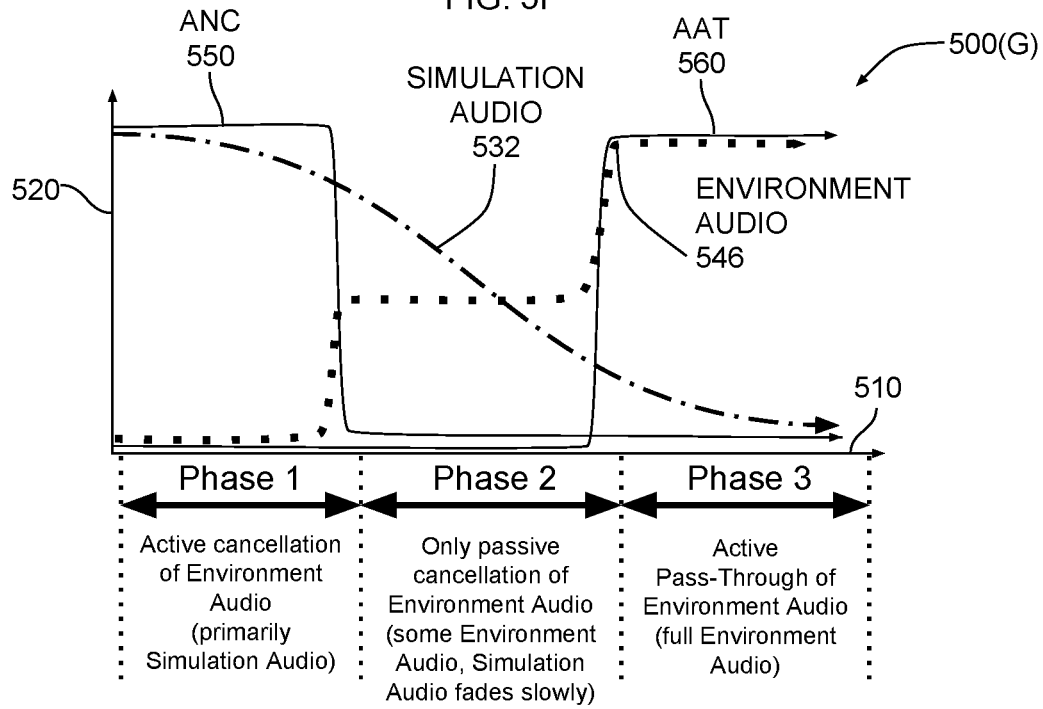
Figure 5H:
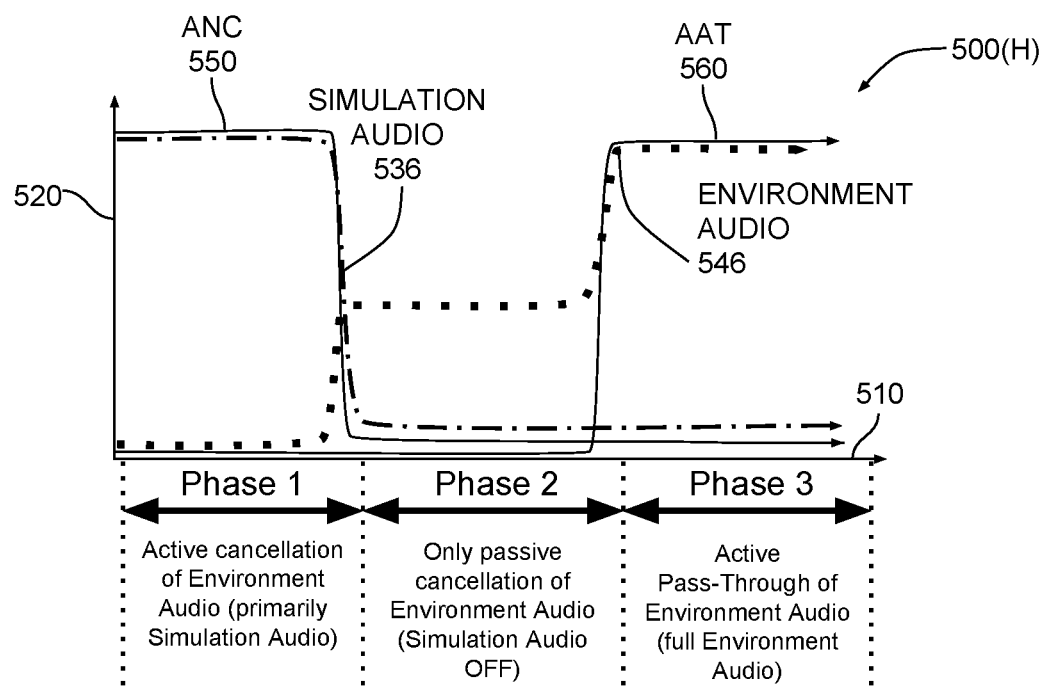
Figure 6:
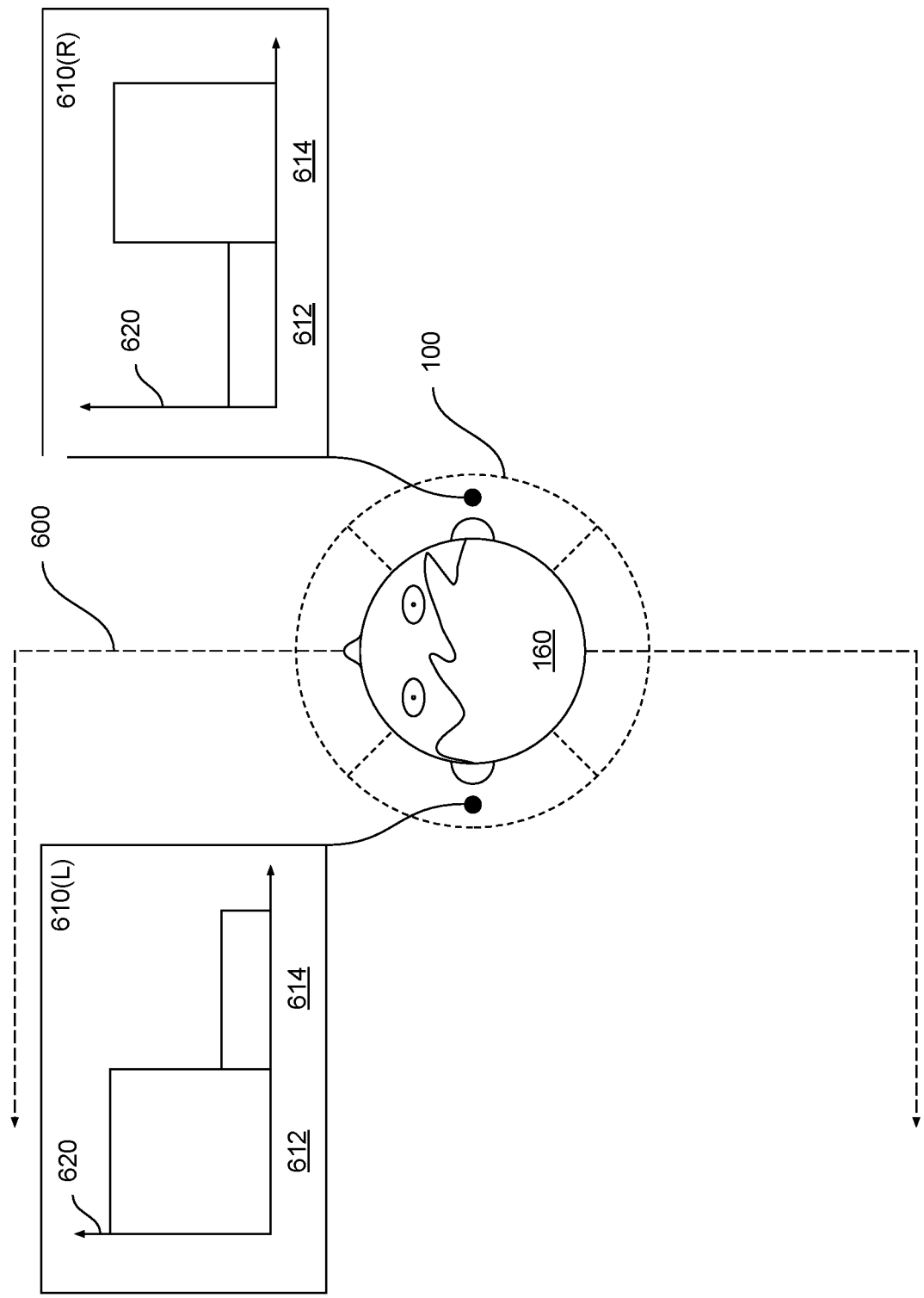
FIG. 6 illustrates how the simulation application of FIG. 2 bilaterally mixes environment audio with simulation audio, according to various embodiments.

FIGS. 4-6 illustrate examples of techniques that simulation application 230 may implement to mix audio derived from environment 300 (referred to hereinafter as "environment audio") with audio associated with simulation 360 (referred to hereinafter as "simulation audio"). Although these examples focus on audio mixing techniques, persons skilled in the art will understand that these techniques may also be used to combine optical data derived from environment 300 with graphics associated with simulation 360.

FIG. 4 illustrates a boundary for mixing environment audio with simulation audio, according to various embodiments. As shown, user 160 resides within a boundary 400. Boundary 400 may represent a designated simulation area defined by user 160 or established by simulation application 230. As user 160 moves towards boundary 400 or away from boundary 400, simulation application 230 modifies a mixture that includes environment audio and simulation audio. For example, as user 160 moves along trajectory 410 from position 412, through position 414, to position 416, simulation application 230 progressively decreases the amplitude of simulation audio and/or facilitates an increase in amplitude of environment audio. Simulation application 230 may also implement a hard switch at position 414 between simulation audio and environment audio. Again, simulation application 230 may implement ANC and/or AAT to control audio magnitudes. Simulation application 230 may modulate the amplitudes of these two audio sources using various techniques described below in conjunction with FIGS. 5A-5H.

FIGS. 5A-5H illustrate various graphs of how the simulation application of FIG. 2 mixes environment audio with simulation audio, according to various embodiments. These techniques may be specified in mixing protocols 330 shown in FIG. 3. As shown in FIG. 5A, a graph 500(A) includes position axis 510, amplitude axis 520, simulation audio curve 530, and environment audio curve 540. Position axis 510 indicates positions 412, 414, and 416 along trajectory 410. Amplitude axis 520 indicates audio levels associated with environment audio and simulation audio. Simulation audio curve 530 indicates the audio amplitude associated with simulation 360 as a function of the position of user 160. Environment audio curve 540 indicates the audio amplitude associated with environment 300 as a function of the position of user 160.

According to graph 500(A), simulation audio curve 530 remains at a constant high level and environment audio curve 540 remains at a constant low level until user 160 reaches position 414, which coincides with boundary 400. Beyond position 414, simulation audio curve 530 drops to a low level and environment audio curve 540 jumps to a high level. Accordingly, user 160 may primarily (or exclusively) perceive simulation audio when residing inside boundary 400, and then primarily perceive environment audio upon exiting boundary 400. Simulation application 230 may also mix simulation audio and environment audio according to other mixing protocols described below in conjunction FIGS. 5B-5H.

As shown in FIG. 5B, graph 500(B) includes simulation audio curve 532 and environment audio curve 542. As user 160 traverses trajectory 410, simulation audio curve 532 gradually decreases and environment audio curve 542 gradually increases (an audio effect commonly known as a "cross fade"). At position 414, these two curves have approximately equal magnitude. Beyond position 414, simulation audio curve 532 decreases to a minimum level and environment audio curve 542 increases to a maximum level. This approach may ease the transition from simulation audio to environment audio compared to the approach discussed above in conjunction with FIG. 5A. FIG. 5C illustrates another approach to mixing environment audio and simulation audio.

As shown in FIG. 5C, graph 500(C) includes simulation audio curve 534 and environment audio curve 536. As user 160 traverses trajectory 410, simulation audio curve 532 gradually decreases and environment audio curve 542 gradually increases until, at position 414, these two curves reach similar amplitudes. Past position 414, the two curves remain constant.

Referring generally to FIGS. 5A-5C, the various mixing protocols illustrated in graphs 500(A), 500(B), and 500(C) may be implemented in the context of monaural sound or stereo sound to mix environment audio with simulation audio. FIGS. 5D-5H illustrate specific approaches for implementing these mixing techniques that involve using ANC and AAT as user 160 moves along trajectory 410.

As shown in FIG. 5D, position axis 510 of graph 500(D) is divided into phases 1, 2, and 3. Phase 1 corresponds to a first portion of trajectory 410, when user 160 leaves position 412 and begins to move towards position 414. Phase 2 corresponds to a second portion of trajectory 410, when user 160 approaches and passes through position 414. Phase 3 corresponds to a third portion of trajectory 410, when user 160 approaches position 416.

During each of these different phases, simulation application 230 modifies the degree to which ANC is applied to cancel environment audio. ANC 550 in graph 500(D) shows how the level of ANC changes between phases 1, 2, and 3. Similarly, simulation application 230 modifies the degree to which AAT is applied to augment the passage of environment audio to user 160. AAT 560 in graph 500(D) shows how the level of AAT changes between phases 1, 2, and 3. The effects of ANC 550 and AAT 560 on environment audio are shown in FIG. 5E.

As shown in FIG. 5E, ANC 550 minimizes environment audio 546 in phase 1 (when user 160 resides relatively close to position 412). In phase 2 (when user resides close to position 414), some environment audio 546 passes to user 160, although the environment audio in phase 2 may have reduced amplitude. This reduced amplitude may arise due to, for example and without limitation, physical interference caused by audio output devices 130, which may surround the ears of user 160. In phase 3 (close to position 416), AAT 560 actively assists with the passage of environment audio 546. With this approach, simulation application 230 implements ANC and AAT in conjunction with one another to facilitate the transition from full simulation audio to full environment audio as user 160 moves along trajectory 410. Simulation application 230 may also adjust simulation audio in different ways, as shown in FIGS. 5F-5H.

In FIG. 5F, simulation application 230 maintains simulation audio 530 at a high level in phase 1 while also minimizing environment audio 546 via ANC. However, in phase 2 simulation application 230 causes simulation audio 530 to drop rapidly while also relaxing ANC to permit environment 546 to bleed through to user 160. In phase 3, simulation application 230 maintains simulation audio 530 at a low level while augmenting the passage of environment audio 546 via AAT.

In FIG. 5G, simulation application 230 implements a modified cross-fade approach to reduce simulation audio 532 while increasing environment audio 546. In phase 1, simulation application 230 begins to reduce simulation audio 532 while keeping environment audio 546 low using ANC. Then, in phase 2, simulation application 230 relaxes ANC and allows environment audio 546 to increase, while continuing to decrease simulation audio 532. In phase 3, simulation application 230 implements AAT to provide full environment audio 546 while also minimizing or eliminating simulation audio 532.

In FIG. 5H, simulation application 230 implements a hard cutoff to minimize or eliminate simulation audio 532 after phase 1. With this approach, simulation application 230 allows environment audio 546 to bleed through to user 160 without interference in phase 2, and then in phase 3 implements AAT to provide user 160 with full environment audio.

Referring generally to FIGS. 5D-5H, persons skilled in the art will understand that simulation application 230 may modify ANC and AAT levels in a variety of different ways to facilitate a transition between simulation audio and environment audio. In addition, that transition may occur based on other parameters beyond distance along trajectory 410. For example, and without limitation, simulation application 230 could implement any of the audio transitioning techniques discussed in conjunction with FIGS. 5A-5H based on the velocity or acceleration of user 160 relative to boundary 400, instead of position relative to that boundary. FIG. 6 illustrates another approach simulation application 230 implements to mix sounds relative to boundary.

FIG. 6 illustrates how the simulation application of FIG. 2 bilaterally mixes environment audio with simulation audio, according to various embodiments. As shown, user 160 resides partially inside of a boundary 600 and partially outside of boundary 600. Boundary 600 may define a designated simulation area, similar to boundary 400 discussed above in conjunction with FIG. 4. In this configuration, the left side of user 160 (and left ear of user 160) resides inside boundary 600, while the right side of user 160 (and right ear of user 160) does not reside inside that boundary. Simulation application 230 outputs a different mixture of environment audio and simulation audio to each ear of user 160 when user 160 resides on boundary 600.

In particular, simulation application 230 outputs audio mixture 610(L) to the left ear of user 160. Audio mixture 610(L) includes a high level of simulation audio 612(L) and a low level of environment audio 614(L), plotted against amplitude axis 620. Conversely, simulation application 230 outputs audio mixture 610(R) to the right ear of user 160. Audio mixture 610(R) includes a low level of simulation audio 612(R) and a high level of environment audio 614(R), also plotted against amplitude axis 620. With this approach, user 160 may experience an increased sense of situational awareness because simulation audio is louder on the left side of user 160 (towards the designated simulation area), while environment audio is louder on the right side of user 160 (away from that simulation area). Simulation application 230 may also modulate sound levels based on the direction along which user 160 approaches boundary 600, the angle between user 160 and boundary 600, and so forth.

Referring generally to FIGS. 4-6, the examples discussed in these figures generally pertain to situations where simulation application 230 mixes environment audio with simulation audio based on the position of user 160 relative to a boundary. Simulation application 230 may also mix environment and simulation audio together based on specifically identified audio sources, as described in greater detail below in conjunction with FIGS. 7-10.

Mixing Environment Sounds Based on Audio Source Characteristics

Figure 7:
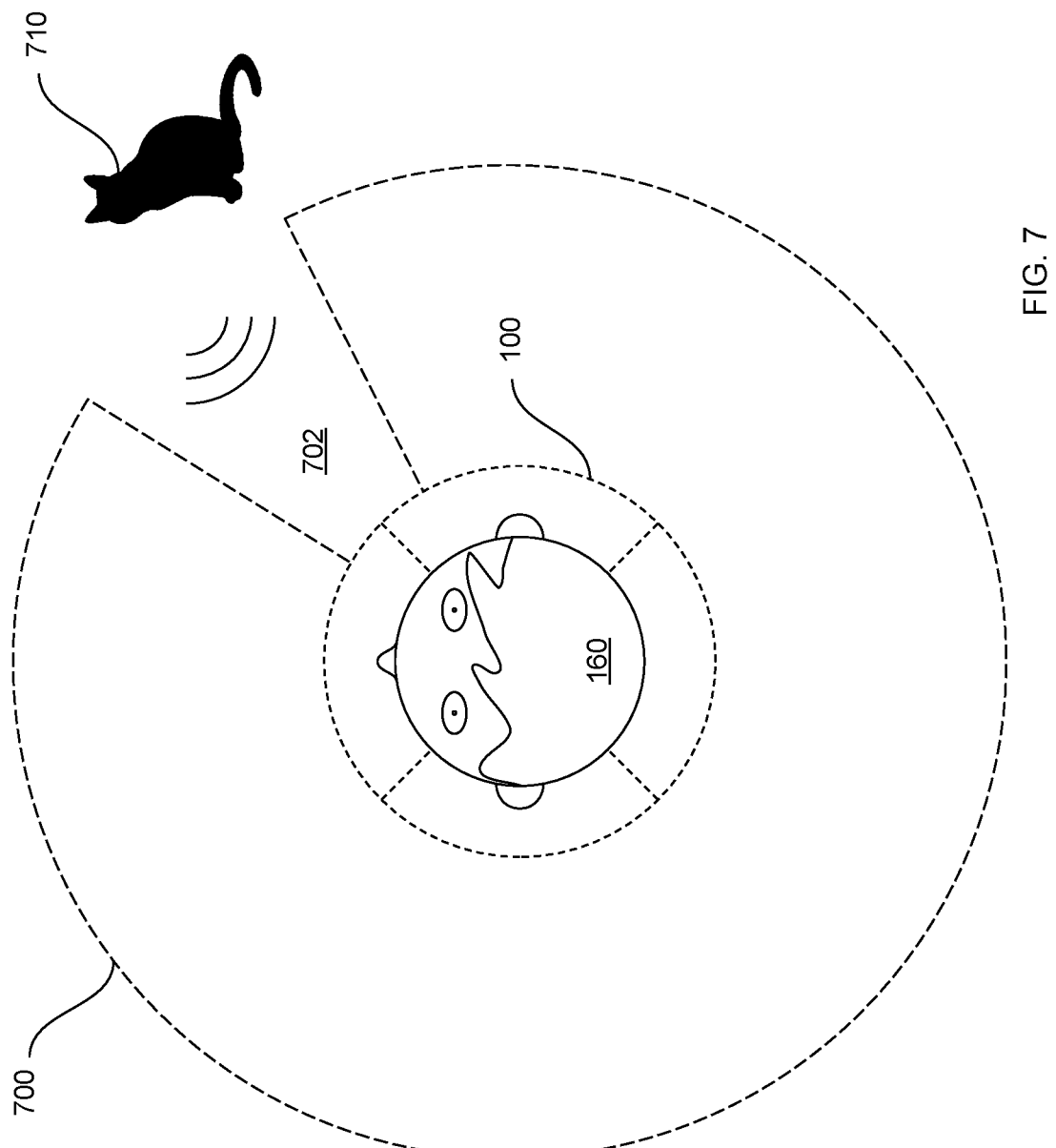
FIG. 7 illustrates how the simulation application of FIG. 2 modifies a simulation soundscape to incorporate an audio source, according to various embodiments.

FIG. 7 illustrates how the simulation application of FIG. 2 modifies a simulation soundscape to incorporate an audio source, according to various embodiments. As shown, user 160 is surrounded by a simulation soundscape 700. Simulation soundscape 700 conceptually represents a stereo or 3D panorama generated as part of simulation 360. Simulation application 230 is configured to suspend or suppress a portion of simulation soundscape 700 in order to accommodate the presence of one or more audio sources.

For example, and without limitation, simulation application 230 could suspend or suppress region 702 of simulation soundscape 700 in response to the presence of a cat 710. Simulation application 230 would reduce any simulation audio that originates from within region 702 and/or amplify environment audio originating from region 702. Thus, when cat 710 meows, simulation application 230 facilitates that sound reaching user 160 despite user 160 also perceiving simulation soundscape 700. Accordingly, user 160 may become aware of the presence of cat 710 while remaining engaged with simulation 360.

Simulation application 230 may identify audio sources, such as cat 710, using computer vision, object recognition, motion detection, and/or proximity detection techniques, among other approaches. In addition, simulation application 230 may detect acoustic signals generated by audio sources and then determine, based on mixing criteria 320, whether those acoustic signals should be incorporated into simulation 360. For example, and without limitation, simulation application 230 could determine that acoustic signals having greater than a threshold loudness should be incorporated into simulation 360. Alternatively, simulation application 230 could determine that only acoustic signals that match a certain audio fingerprint should be incorporated into simulation 360. This particular example is described in greater detail below in conjunction with FIG. 8.

Figure 8:
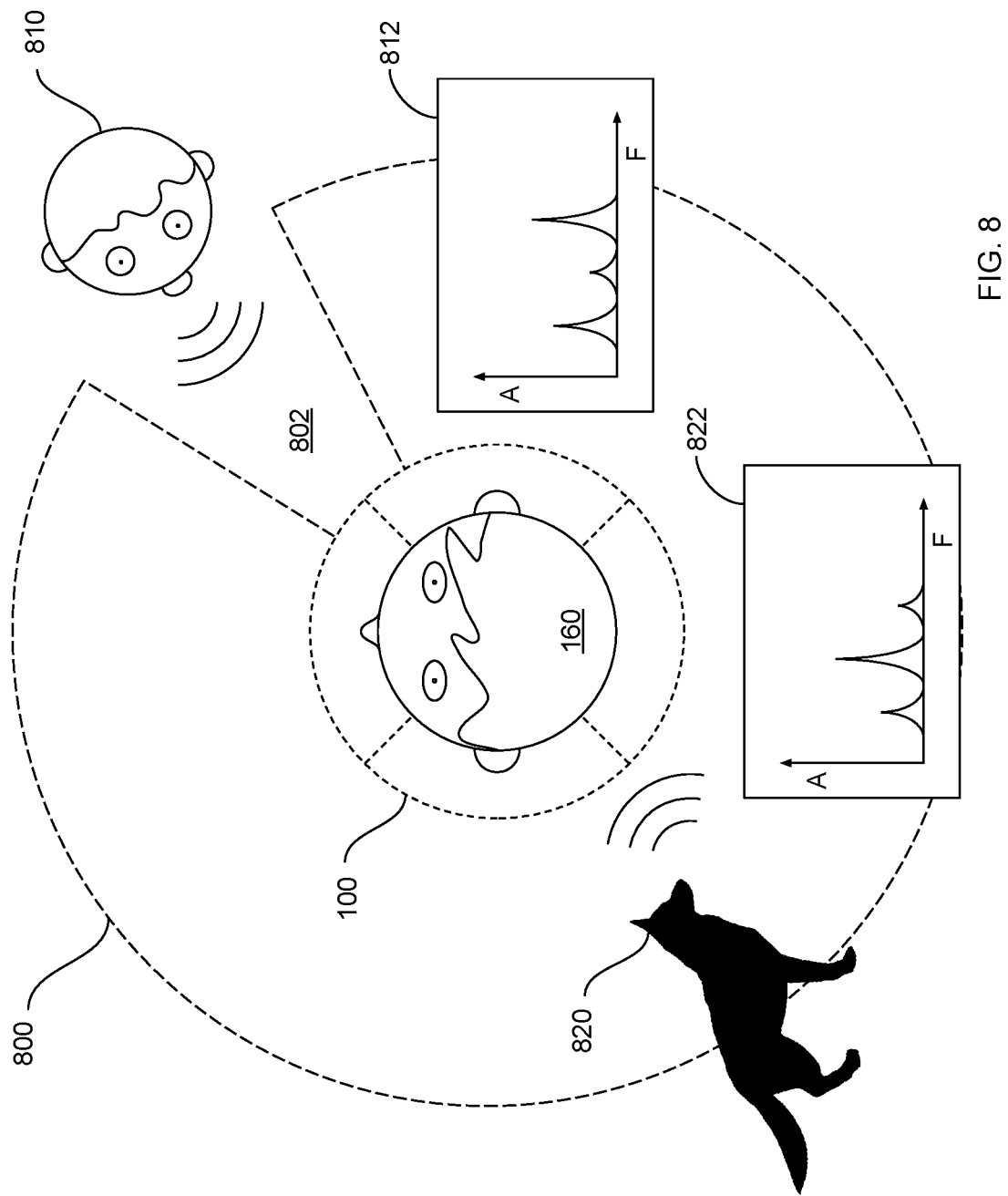
FIG. 8 illustrates how the simulation application of FIG. 2 selectively incorporates audio sources into a simulation soundscape according to audio source characteristics, according to various embodiments.

FIG. 8 illustrates how the simulation application of FIG. 2 selectively incorporates audio sources into a simulation soundscape according to audio source characteristics, according to various embodiments. As shown, user 160 is surrounded by simulation soundscape 800, similar to simulation soundscape 700 discussed above. A person 810 resides proximate to user 160 and generates acoustic signals. In addition, a dog 820 resides proximate to user 160 and generates acoustic signals.

Simulation application 230 is configured to modify simulation soundscape 800 to selectively incorporate acoustic signals from person 810 into simulation 360 without incorporating acoustic signals from dog 820. Simulation application 230 maintains an audio fingerprint 812 that can be used to identify person 810. Upon identifying person 810, simulation application 230 performs one or more techniques to mix acoustic signals from person 810 into simulation 360. Those techniques may include any of the ANC and/or AAT techniques discussed previously. Similarly, simulation application 230 maintains an audio fingerprint 822 that can be used to identify dog 820. Upon identifying dog 820, simulation application 230 may implement ANC to prevent acoustic signals associated with dog 820 from interfering with simulation 360.

User 160 may configure simulation application 230 to "whitelist" and/or "blacklist" certain audio sources using the audio fingerprinting technique discussed above. For example, and without limitation, user 160 could cause simulation application 230 to sample acoustic signals from person 810, generate audio fingerprint 812, and then mark this fingerprint as "allowed." Then, user 160 could cause simulation application 230 to sample acoustic signals from dog 820, generate audio fingerprint 822, and then mark this fingerprint as "not allowed." Subsequently, when simulation application 230 detects an acoustic signal, simulation application 230 would then compare this signal to all audio fingerprints and determine whether the signal is "allowed" or "not allowed." Simulation application 230 would then mix the signal into simulation 360 if the signal corresponds to an "allowed" fingerprint. Simulation application 230 may also use the above approach to whitelist specific categories of sound. For example, and without limitation, user 160 could select "alarms" and "voices" to be included in a whitelist. In one embodiment, the audio fingerprints discussed herein can be generated to represent a characteristic set of frequencies associated with a particular audio source.

Persons skilled in the art will understand that the above techniques may be adapted to recognize objects visually and then include/suppress those objects within simulation 360. For example, and without limitation, simulation system 230 could implement computer vision techniques to match video or visual sensor data of person 810 to an image of person 810 (or images of people in general). Simulation system 230 could also match video of dog 820 to images of dog 820 (or images of dogs in general). These images could be included in a whitelist or blacklist that defines specific imagery that should be allowed into simulation 360.

With this approach, simulation application 230 allows user 160 to selectively maintain a desired level of situational awareness with high granularity. This approach may be useful especially in social contexts, where user 160 may desire to interact with other people yet remain otherwise immersed in simulation 360. Simulation application 230 may also implement additional techniques for identifying audio sources to incorporate into simulation 360, as described in greater detail below in conjunction with FIG. 9.

Figure 9:
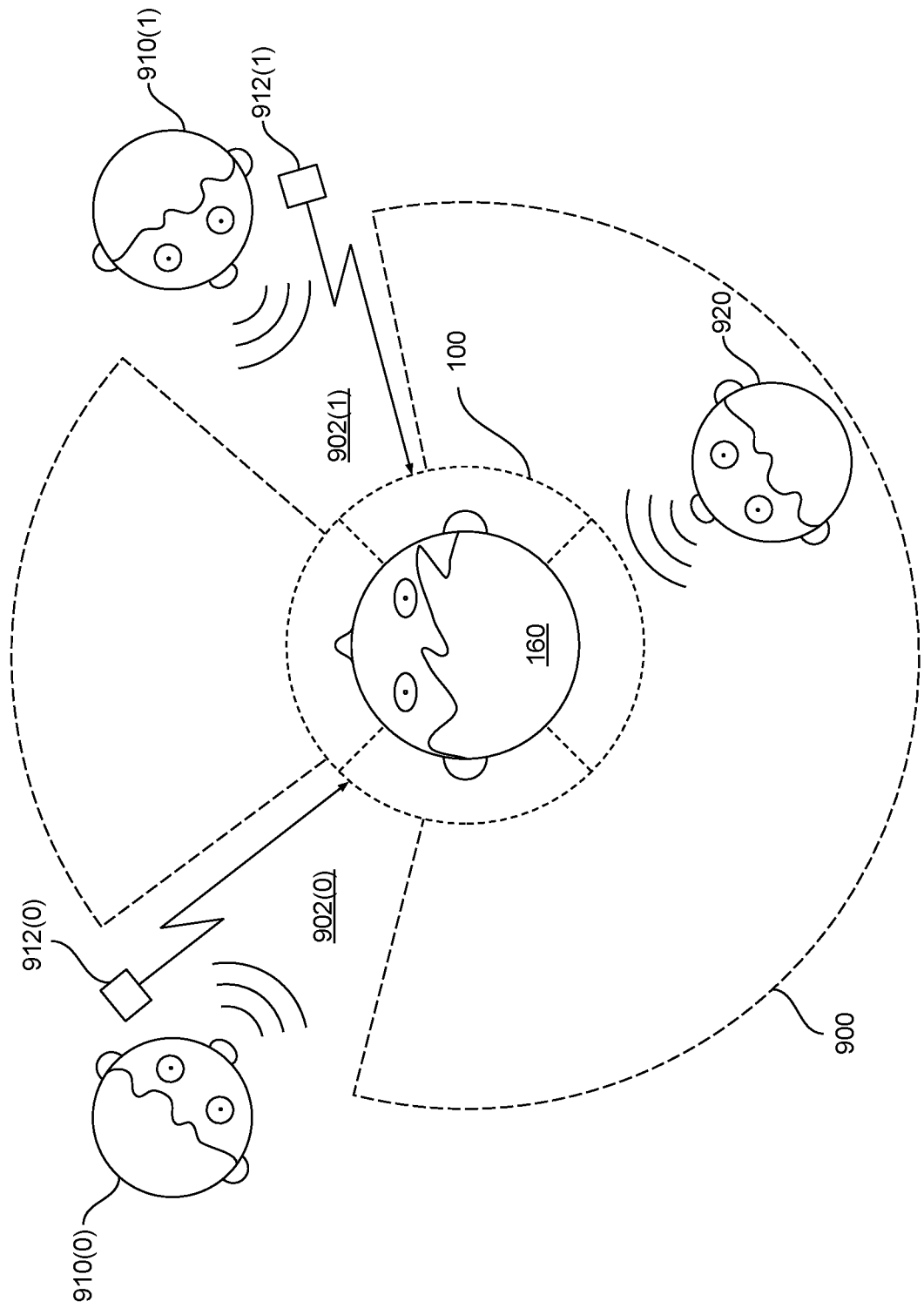
FIG. 9 illustrates how the simulation application of FIG. 2 selectively incorporates audio sources into a simulation soundscape based on an identification process, according to various embodiments.

FIG. 9 illustrates how the simulation application of FIG. 2 selectively incorporates audio sources into a simulation soundscape based on an identification process, according to various embodiments. As shown, user 160 is surrounded by simulation soundscape 900, similar to simulation soundscapes 700 and 800 discussed above. Persons 910(0) and 910(1) reside proximate to user 160 and possess identification devices 912(0) and 912(1), respectively. Identification devices 912 may be independent radio frequency identifier (RFID) devices, or may be included within wearable simulation systems worn by persons 910, among other possibilities. A person 920 also resides proximate to user 160, but person 920 does not possess an identification device 912.

Identification devices 912 transmit signals to wearable simulation system 100. Simulation application 230 receives these signals and then determines that acoustic signals from persons 910 should be incorporated into simulation 360. Simulation application 230 could, for example and without limitation, temporarily whitelist acoustic signals that originate from the same approximate location as identification devices 912. In doing so, simulation application 230 may suspend or suppress simulation soundscape 900 within regions 902(0) and 902(1) in the manner discussed above in conjunction with FIGS. 7-8, thereby allowing acoustic signals from persons 910 to reach the ears of user 160. Accordingly, persons 910 may communicate with user 160, despite user 160 being immersed in simulation 360. However, lacking an identification device 912, person 920 may not be able to communicate with user 160. The techniques described thus far may also be adapted to selectively incorporate audio and/or video associated with advertisements, as described in greater detail below in conjunction with FIG. 10.

Figure 10:
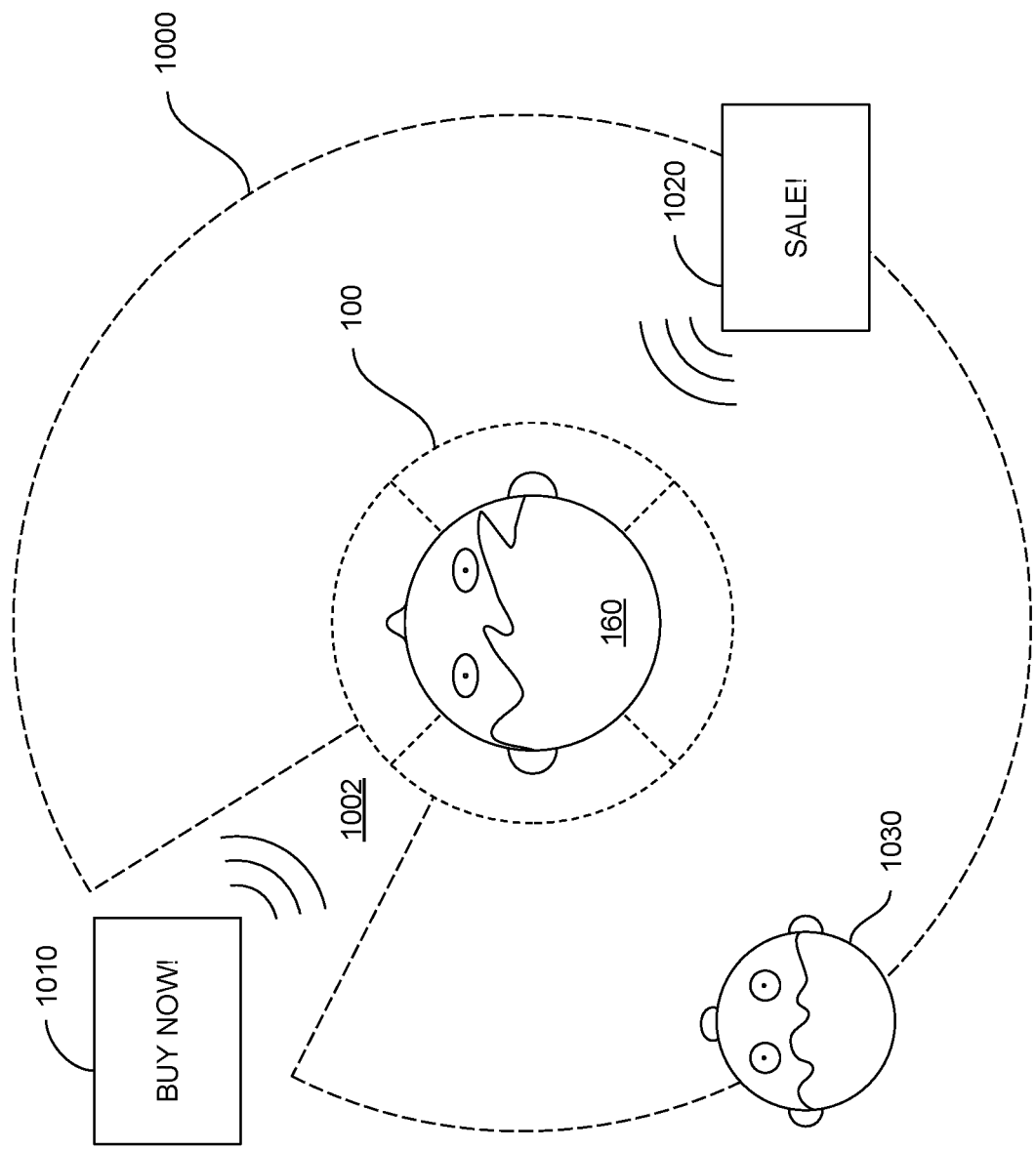
FIG. 10 illustrates how the simulation application of FIG. 2 selectively incorporates advertisements into a simulation soundscape, according to various embodiments.

FIG. 10 illustrates how the simulation application of FIG. 2 selectively incorporates advertisements into a simulation soundscape, according to various embodiments. As shown, user 160 is surrounded by simulation soundscape 1000. Advertisements 1010 and 1020 reside proximate to user 160, along with person 1030. Simulation application 230 is configured to detect advertisement 1010 and then determine that acoustic signals generated by advertisement 1010 should be incorporated into simulation soundscape 1000, while acoustic signals from advertisement 1020 or person 1030 should not. For example, and without limitation, advertisement 1010 could include a specific quick response (QR) code that would temporarily whitelist sounds from advertisement 1010, or those sounds could include an embedded code that simulation application 230 detects to implement audio pass-through (or audio reproduction). In one embodiment, simulation application 230 may operate with specific account settings that allow advertisements from select advertisers to be incorporated into simulation 360. User 160 may upgrade these account settings to disallow those advertisements.

Referring generally to FIGS. 7-10, although the examples discussed herein are directed towards the modification of simulation soundscapes generated in conjunction with simulation 360, persons skilled in the art will understand that the above techniques may be adapted to modify visual landscapes generated in conjunction with simulation 360 as well. For example, and without limitation, simulation application 230 could modify a simulated landscape to include a simulated version of cat 710 shown in FIG. 700. Alternatively, simulation application 230 could suppress visual elements within the simulated landscape in order to allow optical signals associated with advertisement 1010 to be seen by user 160. As a general matter, simulation application 230 may perform any combination of any of the techniques discussed thus far in order selectively combine optical and/or acoustic signals from the environment with optical and/or acoustic signals associated with simulation 360.

Mixing Environment Sounds with Simulation Sounds

Figure 11:
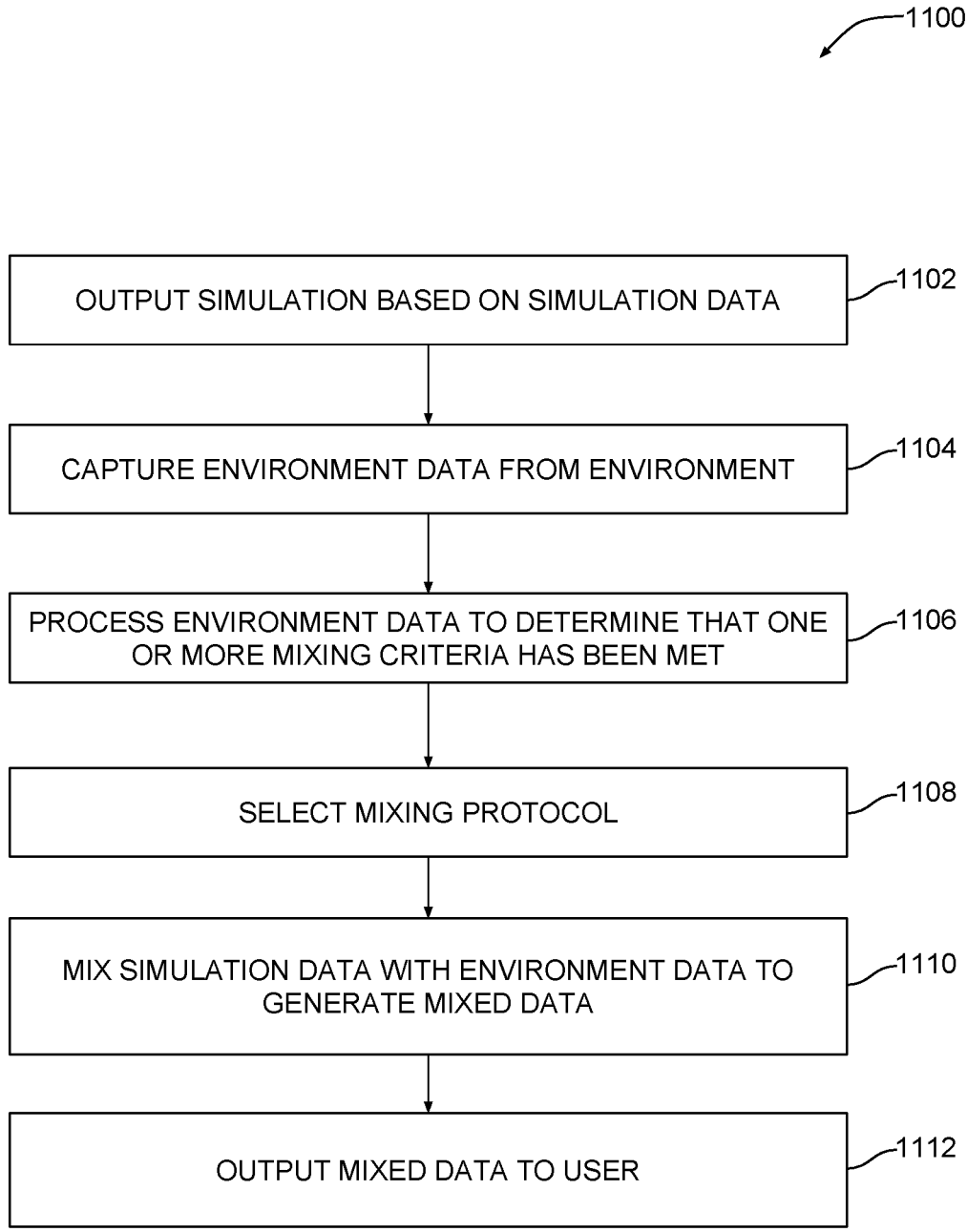
FIG. 11 is a flow diagram of method steps for augmenting a simulation soundscape with environment audio, according to various embodiments.

FIG. 11 is a flow diagram of method steps for augmenting a simulation soundscape with environment sounds, according to various embodiments. Although the method steps are described in conjunction with the systems of FIGS. 1-10, persons skilled in the art will understand that any system configured to perform the method steps, in any order, is within the scope of the disclosed embodiments.

As shown, a method 1100 begins at step 1102, where simulation application 230 outputs simulation 360 to user

160. Simulation 360 may include stereo or 3D audio and/or 3D graphics, among other types of data. Simulation 360 may be an immersive simulation, or represent an augmentation to the real-world environment. At step 1104, simulation application 230 captures optical and/or acoustic signals from environment 300 proximate to user 160. Based on those signals, simulation application 230 generates environment data 310.

At step 1106, simulation application 230 processes environment data 310 to determine that one or more mixing criteria 332 have been met. Mixing criterion 332 may indicate the particular circumstances under which environment audio is incorporated into simulation audio. At step 1108, simulation engine 230 selects a mixing protocol 330 based on mixing criterion 332. In one embodiment, each mixing criterion 332 corresponds to a different mixing protocol 330.

At step 1110, simulation engine 230 mixes environment audio derived from environment 300 with simulation audio associated with simulation 360. At step 1112, simulation application 230 outputs the mixed audio generated at step 1110 to user 160. User 160 may then continue to perceive simulation 360, yet also perceive specific audio that originates from environment 300.

Figure 12:
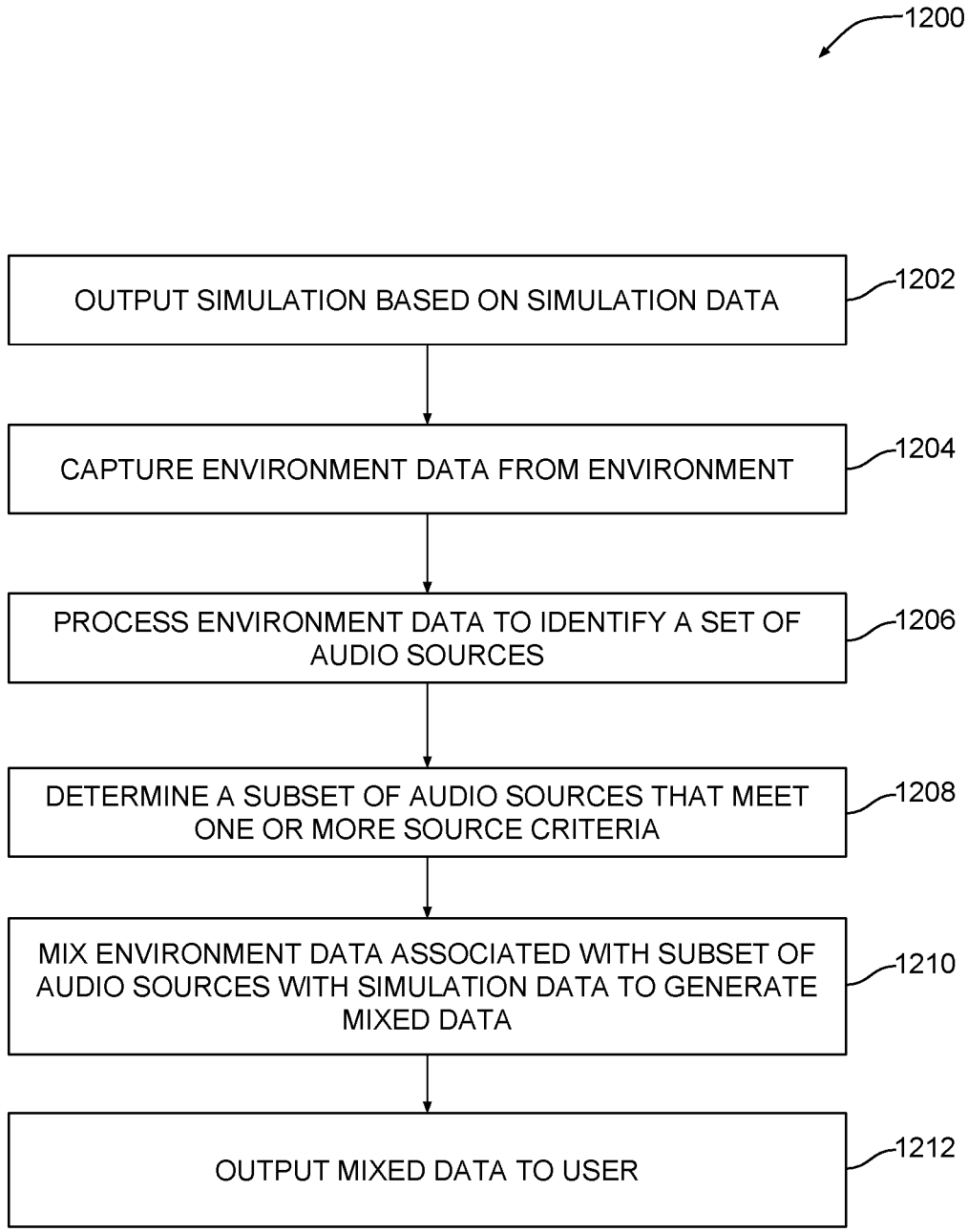
FIG. 12 is a flow diagram of method steps for augmenting a simulation soundscape with selected audio sources, according to various embodiments.

FIG. 12 is a flow diagram of method steps for augmenting a simulation soundscape with selected audio sources, according to various embodiments. Although the method steps are described in conjunction with the systems of FIGS. 1-10, persons skilled in the art will understand that any system configured to perform the method steps, in any order, is within the scope of the disclosed embodiments.

As shown, a method 1200 begins at step 1202, where simulation application 230 outputs simulation 360 to user 160, similar to step 1102 discussed above in conjunction with FIG. 11. At step 1204, simulation application 230 captures optical and/or acoustic signals from environment 300 proximate to user 160 and, based on those signals, generates environment data 310. At step 1206, simulation application 230 processes environment data 310 to identify a set of audio sources. Simulation application 230 could process acoustic signals derived from environment 300 to identify to set of audio sources and/or processes optical signals to identify those sources.

At step 1208, simulation application 230 determines a subset of real-world sources that meet one or more mixing criterion 332. Simulation application 230 could, for example and without limitation, identify sources that match a particular audio fingerprint. Alternatively, simulation application 230 could identify sources that meet specific audio criteria, such as loudness. At step 1210, simulation application 230 mixes environment audio derived from the audio sources in the identified subset with simulation audio associated with simulation 360, thereby generating mixed audio. At step 1212, simulation application 230 outputs the mixed audio to user 160.

In sum, a wearable simulation system worn by a user outputs optical and acoustic signals that cause the user to perceive a simulation. The simulation may be an immersive virtual world or, alternatively, an augmentation to a real-world environment. The wearable simulation system also captures acoustic and optical signals from the environment around the user and selectively incorporates these signals into the simulation. Accordingly, the user may perceive the environment to a limited extent, while still remaining engaged with the simulation.

At least one advantage of the disclosed techniques is that the wearable simulation system does not completely interfere with user perception of the environment, thereby reducing the risk of the user missing important real-world events or being otherwise unaware of real-world events. In addition, the wearable simulation system preserves situational awareness of the user, thereby allowing the user to participate in the real-world environment while also remaining engaged with a simulation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for modifying a simulation generated by a wearable simulation system, the method comprising:
   acquiring sensor data from an environment in which the wearable simulation system is located;
   generating one or more of a spatial, visual, or acoustic model of the environment based on the sensor data;
   determining that the model of the environment meets a first criterion;
   identifying a first protocol corresponding to the first criterion; and
   incorporating a first portion of data into the simulation based on the first protocol, wherein the first portion of data comprises at least one of a representation of a portion of the sensor data or a signal that originates from the environment.

2. The computer-implemented method of claim 1, wherein determining that the model of the environment meets the first criterion comprises determining that the wearable simulation system is approaching a boundary, wherein the boundary defines a designated simulation area.

3. The computer-implemented method of claim 2, wherein the first portion of data is incorporated into the simulation using active acoustic transparency in proportion to a distance between the wearable simulation system and the boundary, and further comprising suppressing a second portion of data that originates from the environment using active noise control in proportion to the distance between the wearable simulation system and the boundary.

4. The computer-implemented method of claim 2, wherein the first portion of data is incorporated into a first portion of the simulation without incorporating the first portion of data into a second portion of the simulation.

5. The computer-implemented method of claim 4, wherein the first portion of the simulation comprises a first audio channel and the second portion of the simulation comprises a second audio channel.

6. The computer-implemented method of claim 1, wherein determining that the model of the environment meets the first criterion comprises determining that the first portion of data is generated by a first entity.

7. The computer-implemented method of claim 6, further comprising:
   identifying a second entity that generates a second portion of data associated with the environment;
   determining that the second portion of data should not be incorporated into the simulation based on a second criterion; and
   suppressing a portion of the simulation based on the second portion of data.

8. The computer-implemented method of claim 6, wherein determining that the first portion of data is generated by a first entity comprises determining that the first portion of data corresponds to a first pattern associated with the first entity.

9. The computer-implemented method of claim 8, wherein the first portion of data comprises an audio signal, and the first pattern comprises an audio fingerprint.

10. The computer-implemented method of claim 8, wherein the first portion of data comprises an optical signal, and wherein the first pattern is included in an image of the first entity.

11. A non-transitory computer-readable medium that, when executed by a processor, causes the processor to modify a simulation generated by a wearable simulation system by performing the steps of:
    acquiring sensor data from an environment in which the wearable simulation system is located;
    generating one or more of a spatial, visual, or acoustic model of the environment based on the sensor data;
    determining that the model of the environment meets a first criterion;
    identifying a first protocol corresponding to the first criterion; and
    incorporating a first portion of data into the simulation based on the first protocol, wherein the first portion of data comprises at least one of a representation of a portion of the sensor data or a signal that originates from the environment.

12. The non-transitory computer-readable medium of claim 11, wherein the step of incorporating the first portion of data into the simulation comprises causing the wearable simulation system to output a simulated version of the first portion of data.

13. The non-transitory computer-readable medium of claim 11, wherein the step of incorporating the first portion of data into the simulation comprises causing the wearable simulation system to enable the first portion of data to pass through the wearable simulation system to a user.

14. The non-transitory computer-readable medium of claim 11, wherein the first portion of data comprises an audio signal, and the step of incorporating the first portion of data into the simulation comprises updating an audio soundscape associated with the simulation to include the audio signal.

15. The non-transitory computer-readable medium of claim 11, wherein the first portion of data comprises an optical signal, and incorporating the first portion of data into the simulation comprises updating a visual landscape associated with the simulation to include an image that corresponds to the optical signal.

16. The non-transitory computer-readable medium of claim 11, wherein the step of determining that the model of the environment meets the first criterion comprises determining that the model of the environment uniquely identifies a first entity.

17. A wearable simulation system that generates a simulation, comprising:
   a memory storing a simulation application; and
   a processor that executes the simulation application to perform the steps of:
      acquiring sensor data from an environment in which the wearable simulation system is located,
      generating one or more of a spatial, visual, or acoustic model of the environment based on the sensor data;
      determining that the model of the environment meets a first criterion,
      identifying a first protocol corresponding to the first criterion, and
      incorporating a first portion of data into the simulation based on the first protocol, wherein the first portion of data comprises at least one of a representation of a portion of the sensor data or a signal that originates from the environment.

18. The wearable simulation system of claim 17, wherein the first portion of data comprises an audio signal, and the step of incorporating the first portion of data into the simulation comprises updating an audio soundscape associated with the simulation to include the audio signal.

19. The wearable simulation system of claim 17, wherein the first portion of data comprises an optical signal, and the step of incorporating the first portion of data into the simulation comprises updating a visual landscape associated with the simulation to include an image that corresponds to the optical signal.

20. The wearable simulation system of claim 17, wherein the first portion of data is incorporated into a first portion of the simulation without incorporating the first portion of data into a second portion of the simulation.

\* \* \* \* \*